Patented Feb. 6, 1934

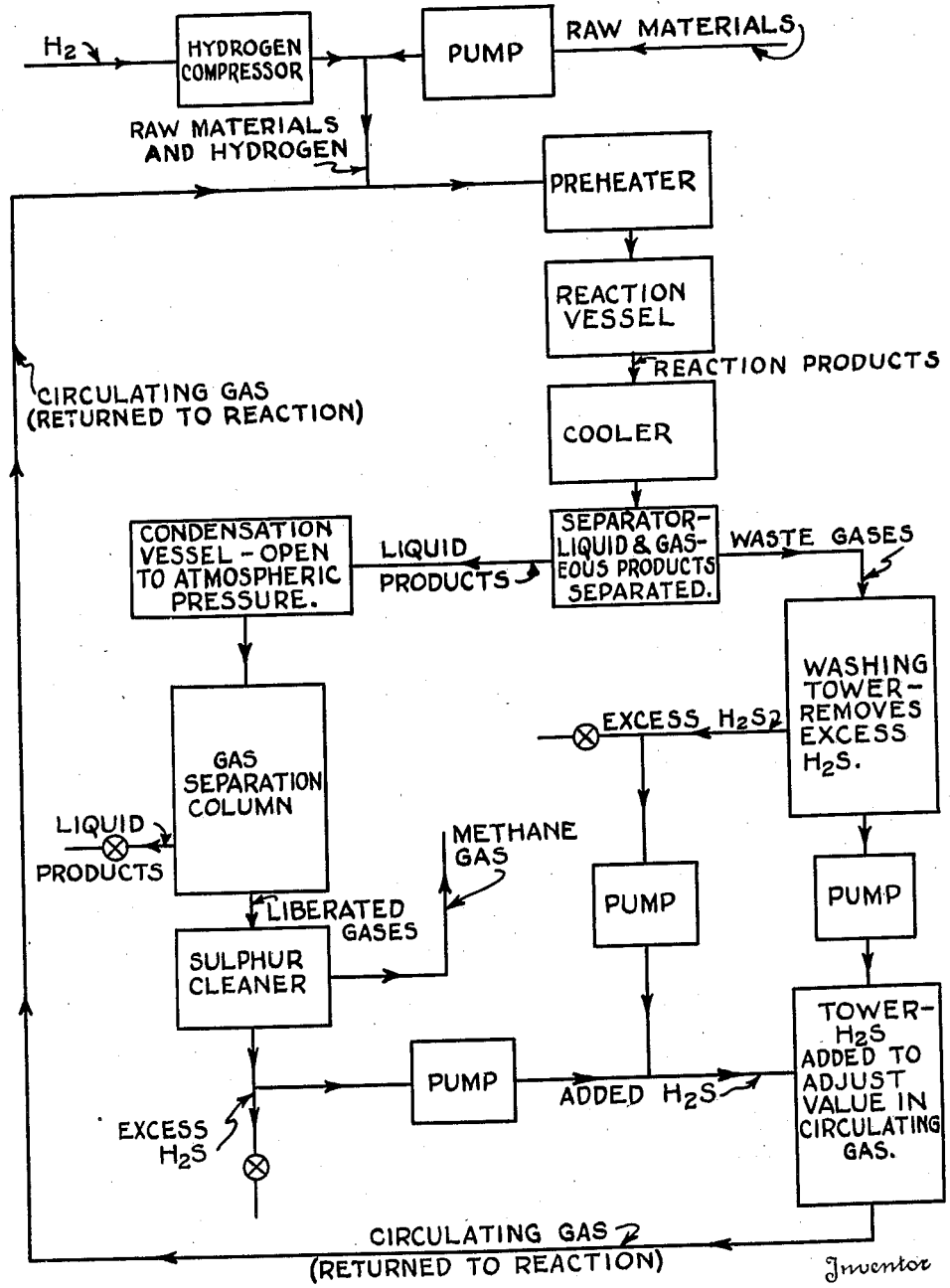

1,946,341

UNITED STATES PATENT OFFICE

1,946,341

DESTRUCTIVE HYDROGENATION OF CARBONACEOUS MATERIALS

Lajos von Szeszich, Constance, Germany, assignor to Deutsche Gold- & Silber-Scheideanstalt, vormals Roessler, Frankfort-on-the-Main, Germany Application March 30, 1931, Serial No. 526,545, and in Germany and Austria April 5, 1930

11 Claims. (Cl. 196—53)

This invention relates to the treatment of carbonaceous materials of various kinds with hydrogen or with gases containing or yielding hydrogen at high temperatures and pressures in order to convert the starting materials by processes of hydrogenation, reduction, or splitting into valuable products which are usually liquid. Anthracite, coal, wood, peat, lignite and products obtained from them by distillation, extraction (decomposition) and other forms of treatment or constituents of such products and so forth for example may serve as starting materials for these processes. Furthermore, further conversion products which are obtained by cracking, hydrogenation, and the like may be treated by such processes. Other starting materials include for example, mineral oils, bitumens of the most different kinds, for example, petroleum, shale oils, asphalts, mineral waxes, and the like as well as products obtained from them.

It is already known to carry out the hydrogenation of such carbonaceous materials in the presence of catalysts of various kinds and having various properties especially metals and metal compounds such as oxides, sulphides and the like.

The flow sheet which forms the drawing illustrates the steps comprising my novel process in a clear, definite and succinct manner. The various steps shown thereon will be more fully pointed out in the ensuing complete disclosure.

According to the present invention, hydrogenation processes of the kind above referred to, are favourably influenced by hydrogen sulphide by employing the hydrogen sulphide in combination with certain other catalysts and by adjusting the amount of hydrogen sulphide in each particular case so that the increases in activity aimed at are produced. Iron, cobalt, or nickel or compounds of these metals, such as, for example oxides, hydroxides, sulphides and so forth constitute suitable catalysts for carrying out the novel process.

In general it has been found to be more advantageous to use oxygen compounds of the metals, for example, cobalt hydroxide and to convert these during the hydrogenation process to a greater or less extent into a metal sulphur compound instead of employing prepared sulphides. Apparently metal sulphur compounds are formed as a result which are not identical with the usual sulphides as regards their chemical or physical properties or both. In using metals or metal compounds thus converted into sulphur compounds, hydrogen sulphide, sulphur or the like is employed in such amounts that more hydrogen sulphide is present than can be combined with the metal or the metal compound under the given operating conditions. In general, it has been found that the amount of hydrogen sulphide should be so regulated that the excess over the amount necessary for the conversion of the metals or metal compounds into the corresponding sulphur compound amounts to 1 to 15% calculated on the material to be hydrogenated. The excess of hydrogen sulphide within these limits necessary for the production of optimum effects must be determined by preliminary experiments for each case.

By proceeding in the above way, starting materials free from sulphur or poor in sulphur may be adjusted to a suitable content of sulphur for the production of optimum effects with the addition of the necessary amounts of metal compounds or metals, particularly the said metal oxygen compounds, by the addition of hydrogen sulphide. Starting materials which naturally possess a content of sulphur which is sufficient in itself for producing optimum effects, the hydrogenation of which can neither be improved by increasing or reducing the content of sulphur, could be treated by the addition of the necessary amounts of auxiliary substances. Starting materials which contain larger amounts of sulphur than are needed for the production of optimum effects, are adjusted to suitable conditions by lowering their sulphur content.

Instead of the addition of hydrogen sulphide or materials yielding hydrogen sulphide, such as sulphur, to starting materials free from or poor in sulphur, such amounts of starting materials rich in sulphur may be added to them that the mixture contains the optimum amount of sulphur for carrying out the hydrogenation. Conversely, materials free from sulphur or poor in sulphur may be added in suitable amounts to starting materials rich in sulphur in order to adjust the latter to the desired optimum amounts of sulphur.

The hydrogenation is, in general, carried out at pressures of more than 100 atmospheres, and, in some cases, at very much higher pressures and at temperatures which lie between 350° and 600° preferably with the use of hydrogen in excess and in some cases in large excess; the process may be carried out discontinuously or continuously.

The hydrogen in excess may be maintained in circulation and care taken that such amounts of hydrogen sulphide are present in the circulating current of hydrogen that as a result the activity of the catalysts is increased. For example, the gases led off from the hydrogenation process may be subjected to a partial reduction in pressure and the first portion of gas rich in hydrogen thus obtained conducted back to the hydrogenation process and the content in hydrogen sulphide of the circulating hydrogenation gases is maintained at such a value that it, together with the hydrogen sulphide arising from the sulphur content of the starting material, increases the activity of the catalyst. The concentration of hydrogen sulphide in the circulating hydrogenation gases can be adjusted to the desired value by correct choice of the degree of reduction in pressure, by regulation of the temperature, by suitable adjustment of the time of contact between gas and liquid and by similar precautions. Upon completely reducing the pressure of the liquid products of hydrogenation to atmospheric pressure, a second portion of gas rich in hydrocarbons is obtained which also contains considerable amounts of hydrogen sulphide.

In case the content of hydrogen sulphide of the first portion of gas is not sufficient, the hydrogen sulphide may be extracted from the second portion of gas by known methods and the deficiency added to the first part of the gas.

According to another method of carrying out the invention, the mode of working is such that the gases taken off from the hydrogenation process are divided into a liquid and a gaseous portion, while maintaining the working pressure and the gaseous portion, consisting mainly of hydrogen, is led back into the reaction vessel together with such amounts of hydrogen sulphide that in the latter a concentration of hydrogen sulphide is maintained by means of which the activity of the catalysts is increased.

By this method of working, only relatively insignificant differences in pressure have to be dealt with and consequently only simple apparatus are necessary, which in some cases enables considerable increase in pressure to be easily produced for restoring the reaction pressure. In the treatment of materials rich in sulphur, the gas led off in some cases, contains so much hydrogen sulphide that upon conducting back the unaltered gases an enrichment in hydrogen sulphide above the optimum concentration would take place. In this case a part of the hydrogen sulphide is removed in known manner or even the whole amount is removed and then the necessary amount of hydrogen sulphide is returned to the gas.

Oils poor in sulphur which are themselves to be subjected to hydrogenation may be employed with advantage to take up the hydrogen sulphide so that this oil is itself adjusted to the optimum content of sulphur.

For example, only a portion of the gases rich in hydrogen which come off from the hydrogenation process may have the hydrogen sulphide extracted completely or to a large extent, and by mixing the washed gas with the unwashed gas, the content of hydrogen sulphide in the gases led back to the reaction vessel may be adjusted to the desired value.

In some circumstances, the desired result of adjustment to an optimum concentration of hydrogen sulphide in the circulating gas, may be produced in a simple manner by blowing off a definite amount of the gas containing hydrogen sulphide through a valve and replacing the amount of gas containing hydrogen sulphide thus blown off by a corresponding amount of hydrogen. The hydrogen or hydrogen sulphide of the gases removed can be utilized again. Both methods of operation—the removal of part of the hydrogenation gases and the withdrawal of desired amounts of hydrogen sulphide—may be combined together.

Obviously with all these methods fresh hydrogen must always be allowed for as a substitute for the hydrogen consumed.

In cases in which the content of hydrogen sulphide of the gases containing hydrogen is not sufficient, in order to ensure the optimum increase in activity of the catalyst, care must be taken to add the amount of hydrogen sulphide lacking or such amounts of hydrogen sulphide, sulphur or other sulphur compounds yielding hydrogen sulphide must be added to the oils or the like to be hydrogenated that the desired concentration in hydrogen sulphide in the reaction vessel is obtained with certainty.

The addition of hydrogen sulphide to the circulating current of gas may be effected in all forms of the invention with advantage after the current of gas has passed the conveying devices such as pumps and the like, that is to say, immediately before the return of the gases into the hydrogenation vessel. The necessary hydrogen sulphide can thus be introduced together with the fresh hydrogen. When the content of hydrogen sulphide in the circulating gases ensures exactly the optimum concentration of hydrogen sulphide in the contact chamber, it is rather to be recommended, that the hydrogen sulphide should be removed before the gases reach the conveying device as completely as possible, for example by a washing process while the pressure is maintained and should be led back into the cycle in suitable amounts after passing the conveying apparatus. This form of the process, in addition to the advantages already set forth in regard to the adjustment to the optimum concentration of hydrogen sulphide, has yet the further advantage that it renders unnecessary the use of special corrosion resisting materials which resist the attack of hydrogen sulphide or the sulphur compounds in the conveying devices since any corrosion is avoided by leading the corrosive constituents of the gas around the conveying devices.

In carrying out the invention, the mixture of gases or vapours passing from the hydrogenation vessel may be conducted through suitable cooling devices and is then led, for example, into a first washing tower. In this, water under pressure runs from above in counter-current to the mixture so that the washing tower acts at the same time as an injection cooler. The mixture running off is separated into an aqueous liquid and an oily condensate. The aqueous layer which contains the ammonium sulphide and the greater part of the hydrogen sulphide in solution and is under the same pressure as exists in the reaction vessel is, for example, led to a montejus plant; this for example conveys the aqueous liquid with sufficient highly compressed hydrogen into a second washing tower. Here the circulating gas enters and in some cases is practically completely freed from hydrogen sulphide by means of alkaline liquids in a subsequent washer; then by means of a circulating pump for example, it is brought to the necessary working pressure.

In the second washing tower, the gas is charged with the necessary amount of hydrogen sulphide, for example by being brought into intimate contact with the washing liquid from the first tower containing hydrogen sulphide. The taking up of the hydrogen sulphide can be facilitated, for example, by heating. The mixture of the hydrogenating gas and hydrogen sulphide is introduced directly into the hydrogenation vessel from the second tower.

The condensate obtained from the condensation under pressure may serve as the source of the hydrogen sulphide to be added. The hydrogen sulphide may conveniently be obtained from this by treatment with washing liquids and by being driven off, for example, by heating.

However, the hydrogen sulphide to be added may be obtained from the so-called methane fraction which is obtained on reducing the pressure of the condensate. The gases containing methane may, for example, be washed with milk of lime and the hydrogen sulphide thus taken into combination may be liberated again under pressure by means of acids. The hydrogenating hydrogen or the added hydrogen at reaction pressure may with advantage be led through preferably while heated to the washing liquid with which the methane gases are washed and, in this way, charged wtih hydrogen sulphide. Also for example, the methane gases may also be washed with the oil to be hydrogenated and, as a result, hydrogen sulphide is introduced into the process in such amounts that, together with the amounts led back by the circulating gas current into the reaction vessel, optimum amounts of hydrogen sulphide are maintained in the reaction vessel. Finally, for example, the procedure may be such that the hydrogen sulphide is obtained from the methane gases, for example, by washing and is converted into sulphur in the usual way and the sulphur so obtained is added to the oil to be hydrogenated in such amounts that the content of sulphur together with the hydrogen sulphide introduced into the process by the hydrogenation gas yields the desired concentration of hydrogen sulphide. In some circumstances, it may also be advantageous to subject the liquid product of the condensate to a partial reduction in pressure, the intermediate pressure to which it is reduced being so chosen that a methane fraction is obtained with a definite content of sulphur which is exactly the desired content.

Example 1

200 grammes of a Mexican petroleum residue of specific weight 0.999 with a content of sulphur of 2.97 per cent are heated in an autoclave in the presence of 3 per cent of cobalt hydroxide with 5 per cent of hydrogen sulphide for an hour with hydrogen with an initial pressure of 100 atmospheres at 410°. 79 per cent of an oil of specific weight 0.867 is obtained which contains 42 per cent of constituents boiling up to 180° or 33 per cent calculated on the starting material.

When the process is carried out with the same conditions otherwise but in the absence of hydrogen sulphide, only 26 per cent of benzine boiling up to 180° calculated on the starting material are obtained.

Example 2

300 grammes of an English hard coal low temperature tar of a specific weight of 1.062 with a content of sulphur of 0.85 per cent are heated in the presence of 5 per cent of cobalt hydroxide and 5 per cent of sulphur with hydrogen at an initial pressure of 110 atmospheres for an hour at 475°. 219 grammes of oil of specific weight 0.834 are obtained with 64 per cent of hydrocarbons boiling below 180°.

In the absence of hydrogen sulphide under the same conditions otherwise, 240 grammes of oil of specific weight 0.935 are obtained with only 23 per cent of constituents boiling below 180°.

Example 3

Wood tar oil is heated in the presence of 5 per cent nickel hydroxide and 8 per cent hydrogen sulphide with hydrogen at an initial pressure of 110 atmospheres for an hour at 440°. 80 per cent of oil of specific weight 0.956 are obtained with 26.3 per cent of benzine boiling up to 180°.

In the absence of hydrogen sulphide only 62 per cent of oil of a specific weight 0.987 is obtained with a content of 17.8 per cent of benzine.

Example 4

A creosote oil of specific weight 0.979 per cent with 0.9 per cent of sulphur and 4.5 per cent of constituents boiling up to 180° are led continuously with hydrogen at 200 atmospheres at 470 to 480° over a catalyst of ferric hydroxide on silica gel. The proportions of oil and hydrogen are so regulated that there is 1.500 litres of hydrogen to 1 kilogramme of oil.

1 per cent of hydrogen sulphide, calculated on the starting material 2.3 per cent are added to the hydrogen. 79.3 per cent of oil of specific weight 0.914 is obtained with a content of benzine boiling up to 180° of 50 per cent or 39.7 per cent calculated on the starting material.

When working without hydrogen sulphide, 95.5 per cent of oil of specific weight 0.944 is obtained with a content of benzine boiling up to 180° of 29 per cent or 27.7 per cent calculated on the starting material.

Example 5

A brown coal tar middle oil of specific weight 0.979 and with a sulphur content of 0.9 per cent is so hydrogenated at 200 atmospheres in the presence of a catalyst of nickel hydroxide in a current of hydrogen that for each kg. of oil, 1560 litres of hydrogenating gas are employed. The reaction is effected with the addition of 2 per cent of sulphur to the brown coal tar middle oil. The products of reaction are reduced in pressure to 100 atmospheres and cooled. For each kg. of oil used, 970 litres of the first gas measured at 760 mm. and 0° is obtained from the reduction in pressure and which contains about 83 per cent of hydrogen, 12.5 per cent of hydrocarbons and 21.8 mgms. of hydrogen sulphide. This gas is again compressed to 200 atmospheres and after the addition of 590 litres of fresh hydrogen is again conducted back to the hydrogenation vessel. Upon further reduction in pressure to atmospheric pressure 87 litres of the second gas are obtained with 13 per cent hydrogen, 79 per cent methane hydrocarbons and 90 mg. of hydrogen sulphide per litre.

The reaction product obtained is a light coloured oil of specific weight 0.842 with 58 per cent of constituents boiling up to 180°, no phenols and scarcely any unsaturated hydrocarbons.

If the same brown coal tar middle oil is hydrogenated under the same conditions, but without leading back the first gas to the process, but 1560 litres of fresh hydrogen are always used per kg. of the starting material, a product of hydrogenation is obtained of specific weight 0.858 with 5 per cent phenols and 11 per cent unsaturated hydrocarbons and only 50 per cent of constituents boiling up to 180°.

Example 6

Crude mineral oil of specific weight 0.868 and 2.6 per cent content of sulphur is hydrogenated at 450 to 560° under 200 atmospheres hydrogen pressure. Cobalt hydroxide serves as the catalyst. By means of preliminary experiments it was established that the optimum catalytic activity of the cobalt catalyst with this mineral oil lies at a value of 6 per cent of hydrogen sulphide calculated on the crude oil.

The hydrogenation is carried out under conditions such that 1780 litres of hydrogenation gas are employed per kg. of oil. Subsequently, the hydrogenation was effected by the addition of 3 per cent of sulphur to the mineral oil and after condensation of the reaction products at 200 atmospheres pressure, 1335 litres of a gas rich in hydrogen with 95.8 per cent of hydrogen and 2 per cent methane was evolved and which contains 30 mg. of hydrogen sulphide per litre.

Thus by means of this gas, 37.8 gms. of sulphur was recovered per kg. of oil. However, in order to maintain the optimum, only 30 gms. of sulphur are necessary. Thus of the 1335 litres of gas, 335 litres was led off and was freed from hydrogen sulphide by means of alkaline iron hydroxide suspension. The gas, thus freed from hydrogen sulphide, is led back to the reaction together with 445 litres of fresh hydrogen and 1000 litres of unwashed gas containing hydrogen sulphide. Upon reducing the pressure of the liquid condensation product, another 113 litres of gas are evolved with 59 per cent methane hydrocarbons, 35 per cent hydrogen and 160 mgms. of hydrogen sulphide per litre.

Upon working in this way, 81.5 per cent of a clear oil of specific weight 0.760 is obtained. The benzene yield amounts to 56 per cent calculated on the starting material. If the treatment is carried out without the addition of sulphur, but only with fresh gas, the yield of oil amounts to 74 per cent and the yield of benzene only 48 per cent.

If the treatment is carried out in circulation without reducing the content of hydrogen sulphide in the gases led off to the necessary amount, the gases become quickly enriched with hydrogen sulphide and the yield in benzene falls rapidly to 40 per cent and even lower.

As the above examples show, by supplying or forming hydrogen sulphide in suitable amounts, increases in yield of valuable oils boiling up to 180° are obtained which amount to a number of times the yield which may be obtained by hydrogenating the same starting materials while using the same metals or metal compounds but omitting the addition of the hydrogen sulphide.

I claim:—

1. A process for the treatment of a carbonaceous material of the class set forth which consists in subjecting the carbonaceous material to the action of hydrogen at a temperature within the range of 350° C. to 600° C. and at pressures in excess of 100 atmospheres, in a reaction vessel, and introducing into said reaction vessel hydrogen sulphide and a catalyst containing a metal selected from the group consisting of iron, nickel and cobalt, the quantity of hydrogen sulphide being so regulated that said hydrogen sulphide is continuously present in optimal amounts between the limits of 1% and 6% by weight of the carbonaceous materials, the action of the catalyst being thereby improved over the action of said catalyst, including the metallic sulphides, when used alone.

2. A process for the treatment of a carbonaceous material of the class set forth which consists in subjecting said carbonaceous material to the action of hydrogen at temperatures of 350° C. to 600° C. and pressures in excess of 100 atmospheres in a reaction vessel containing an oxygen compound of a metal of the group which consists of iron, nickel and cobalt as a catalyst, hydrogen sulphide being supplied to the reaction vessel so that it is continuously present in optimal amounts between the limits of 1% and 6% by weight of the carbonaceous materials so that the action of the catalyst is improved over the action of said catalysts when used alone.

3. A process for the treatment of a carbonaceous material of the class set forth which consists in subjecting said carbonaceous material to the action of hydrogen at temperatures of 350° C. to 600° C. and pressures in excess of 100 atmospheres, in the presence of a catalytic material including an oxygen compound of a metal selected from the group consisting of iron, nickel and cobalt, hydrogen sulphide being continuously present in such optimal amounts within the limits of 1% to 15% by weight of the carbonaceous materials so that the action of said catalyst is improved over the action of said catalytic material when used without hydrogen sulphide being present.

4. A process for the treatment of a carbonaceous material of the class set forth which consists in subjecting said carbonaceous materials to the action of hydrogen at temperatures of 350° C. to 600° C. and pressures in excess of 100 atmospheres in the presence of an oxygen compound of a metal selected from the group consisting of iron, nickel and cobalt and supplying hydrogen sulphide to the sphere of reaction containing the metallic catalyst so that said sulphide is continuously present in amounts between 1% and 8% by weight of the carbonaceous materials, thereby resulting in an improvement in the activity of said catalyst over the action of said catalyst when employed in the absence of hydrogen sulphide.

5. A process for the treatment of a carbonaceous material of the class set forth which consists in treating the carbonaceous material in a reaction vessel with hydrogen at temperatures of 350° C. to 600° C. and at pressures in excess of 100 atmospheres, there being present in said reaction vessel an oxygen compound of a metal selected from the group consisting of iron, nickel and cobalt, and adding to said reaction vessel a substance which is capable of yielding hydrogen sulphide under the operating conditions so that said hydrogen sulphide is continuously present in optimal amounts within the limits of 1% to 6% by weight of the carbonaceous materials so that the action of said metallic catalyst is improved over the action of said catalyst when used alone.

6. A process for the treatment of carbonaceous materials of the class set forth which consists in mixing a carbonaceous material containing sulphur with another carbonaceous material which is poorer in sulphur, treating the mixture with hydrogen at temperatures of 350° C. to 600° C. and at pressures in excess of 100 atmospheres in a reaction vessel containing a catalyst including a metal selected from the group consisting of iron, nickel and cobalt, in an amount sufficient to have a substantial catalytic effect, there being present continuously throughout the entire reaction a quantity of hydrogen sulphide such that the activity of said catalyst is increased over the action of said catalyst including the metallic sulphides when employed in the process in the absence of said hydrogen sulphide.

7. A process for the treatment of carbonaceous materials which consists in mixing a carbonaceous material containing sulphur with another carbonaceous material which is poorer in sulphur, treating the mixture with an atmosphere containing hydrogen at temperatures of 350° C. to 600° C. and at pressures in excess of 100 atmospheres, in a reaction vessel, and supplying to the sphere of reaction a catalyst containing a metal selected from the group consisting of iron, nickel and cobalt, in an amount sufficient to have a substantial catalytic effect, hydrogen sulphide being present in such optimal amounts between the limits of 1% to 15% by weight of the carbonaceous materials that the action of the catalyst is improved over the action of said catalyst including the metallic sulphides when used alone.

8. A process for the treatment of carbonaceous materials which consists in subjecting said materials to the action of hydrogen at temperatures of 350° C. to 600° C. and at pressures in excess of 100 atmospheres, in the presence of an oxygen compound of a metal selected from the group which consists of iron, nickel and cobalt, said process being carried out in a reaction vessel which does not influence the process to any appreciable amount, and supplying to the sphere of reaction hydrogen sulphide in an amount which is in excess of that necessary to convert the oxygen compound of the metal into a sulphur compound, and which has an optimal quantity continuously present during the entire process, said optimal quantity being within the limits of 1% to 8% by weight calculated on the weight of the carbonaceous starting material so that the activity of said catalyst is increased to a value in which it is more active than said catalyst including the metallic sulphides when used alone in the process.

9. A process for the treatment of a carbonaceous material of the class set forth which consists in subjecting said carbonaceous material to the action of hydrogen of temperatures of 350° C. to 600° C. and at pressures in excess of 100 atmospheres in a reaction zone, an added catalyst being present which comprises a metal selected from the group consisting of iron, nickel and cobalt, a current of gas being maintained in circulation which contains hydrogen sulphide in such optimal amounts within the limits of 1% to 6% by weight of the carbonaceous material that the action of said catalyst is improved over the action of said catalyst including the metallic sulphides when used alone.

10. A process for the treatment of carbonaceous materials which consists in subjecting said materials to the action of hydrogen at temperatures of 350° C. to 600° C. and at pressures in excess of 100 atmospheres in a reaction vessel which contains a metal selected from the group consisting of iron, nickel and cobalt, in an amount sufficient to have a substantial catalytic effect, a current of gas being maintained in circulation which contains hydrogen sulphide in such optimal amounts within the limits of 1% to 6% by weight of the carbonaceous materials that the activity of said metallic catalyst is increased above the action of said catalysts including the metallic sulphides when used alone, the hydrogen sulphide being maintained by means of a current of gas which is circulated, the hydrogen sulphide content of said gas being regulated before said gas flows back into the sphere of reaction in its closed cycle of circulation.

11. A process for the treatment of a carbonaceous material of the class set forth, which consists in subjecting said carbonaceous material to the action of hydrogen at temperatures of 350° C. to 600° C. and pressures in excess of 100 atmospheres in a reaction vessel which does not enter into the reaction and which contains an added catalyst selected from the group consisting of iron, nickel and cobalt, maintaining a current of gas in circulation which contains hydrogen sulphide, removing corrosive sulphur compounds, including hydrogen sulphide from the circulating current of gas immediately after the latter flows away from the sphere of reaction, and introducing hydrogen sulphide into the current of gas before the latter flows back into the sphere of reaction, in such an optimal amount between the limits of 1% to 6% by weight of the carbonaceous material that the action of said metallic catalyst is improved over the action of said catalyst, including the metallic sulphides, when used alone.

LAJOS VON SZESZICH.